(12) United States Patent
Gladisch et al.

(10) Patent No.: US 11,592,360 B2
(45) Date of Patent: Feb. 28, 2023

(54) METHOD AND DEVICE FOR TESTING A TECHNICAL SYSTEM

(71) Applicant: Robert Bosch GmbH, Stuttgart (DE)

(72) Inventors: Christoph Gladisch, Renningen (DE); Ji Su Yoon, Leonberg (DE); Joachim Sohns, Ludwigsburg (DE); Philipp Glaser, Stuttgart (DE); Thomas Heinz, Stuttgart (DE); Daniel Seiler-Thull, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/195,275

(22) Filed: Mar. 8, 2021

(65) Prior Publication Data
US 2021/0364393 A1 Nov. 25, 2021

(30) Foreign Application Priority Data
May 20, 2020 (DE) .......................... 102020206321.4

(51) Int. Cl.
*G06F 11/30* (2006.01)
*G01M 99/00* (2011.01)

(52) U.S. Cl.
CPC ................................. *G01M 99/005* (2013.01)

(58) Field of Classification Search
CPC .................................................. G01M 99/005
See application file for complete search history.

(56) References Cited

U.S. PATENT DOCUMENTS

2009/0198474 A1* 8/2009 Fritz ...................... G01D 21/00
702/183
2016/0283715 A1* 9/2016 Duke ..................... G06N 20/00

FOREIGN PATENT DOCUMENTS

DE 10303439 A1 8/2004

* cited by examiner

*Primary Examiner* — Phuong Huynh
(74) *Attorney, Agent, or Firm* — Norton Rose Fulbright US LLP; Gerard Messina

(57) ABSTRACT

A method for testing a technical system. Tests are carried out with the aid of a simulation of the system. The tests are evaluated with respect to a fulfillment measure of a quantitative requirement on the system and different error measures of the simulation. On the basis of the fulfillment measure and each of the error measures, a classification of the tests is carried out as either reliable or unreliable case by case. A selection among the error measures is made on the basis of a number of the tests classified as reliable.

10 Claims, 2 Drawing Sheets

METHOD AND DEVICE FOR TESTING A TECHNICAL SYSTEM

CROSS REFERENCE

The present application claims the benefit under 35 U.S.C. § 119 of German Patent Application No. DE 102020206321.4 filed on May 20, 2020, which is expressly incorporated herein by reference in its entirety.

FIELD

The present invention relates to a method for testing a technical system. The present invention additionally relates to a corresponding device, a corresponding computer program, and a corresponding storage medium.

BACKGROUND INFORMATION

In software technology, using models to automate test activities and generate test artifacts in the test process is summarized under the generic term "model-based testing" (MBT). For example, generating test cases from models which describe the setpoint behavior of the system to be tested is conventional.

Embedded systems in particular are dependent on coherent input signals from sensors and in turn stimulate their surroundings by output signals to various actuators. In the course of the verification and preceding development phases of such a system, in a control loop its model (model in the loop, MiL), software (software in the loop, SiL), processor (processor in the loop, PiL), or overall hardware (hardware in the loop, HiL) is therefore simulated together with a model of the surroundings. In automotive engineering, simulators corresponding to this principle for testing electronic control units are sometimes referred to as component test stands, module test stands, or integration test stands depending on the test phase and test object.

German Patent Application No. DE 10303489 A1 describes such a method for testing software of a control unit of a vehicle, a power tool, or a robotics system, in which a control loop controllable by the control unit is at least partially simulated by a test system in that output signals are generated by the control unit and these output signals of the control unit are transferred to first hardware components via a first connection and signals from second hardware components are transferred as input signals to the control unit via a second connection, the output signals being provided as first control values in the software and additionally being transferred to the test system via a communication interface in real time with respect to the control path.

Such simulations are widespread in various areas of technology and are used, for example to test embedded systems for suitability in power tools, engine control units for drive systems, steering systems, and braking systems, camera systems, systems having components of artificial intelligence and machine learning, robotics systems, or autonomous vehicles in early phases of their development. Nonetheless, the results of simulation models according to the related art are only incorporated to a limited extent in release decisions because of a lack of trust in their reliability.

SUMMARY

The present invention provides a method for testing a technical system, a corresponding device, a corresponding computer program, and a corresponding storage medium.

In accordance with the present invention, the quality of simulation models is decisive for the correct predictability of the test results thus achievable. In the field of MBT, the subdiscipline of validation relates to the object of comparing real measurements to simulation results. Various metrics, measures, or other comparators are used for this purpose, which link signals to one another and are to be referred to in summary hereinafter as signal metrics (SM). Examples of such signal metrics are metrics which compare the size, phase shift, and correlations. Some signal metrics are defined by relevant norms, for example according to ISO 18571.

Expressed in more general terms, uncertainty quantification technologies assist the estimation of the simulation quality and model quality. The result of an assessment of the model quality using a signal metrics or more generally using an uncertainty quantification method for a specific input X, which may be a parameter or a scenario, is denoted hereinafter as the simulation model error metric—in short: error metric—SMerrorX. For the generalization (interpolation and extrapolation) of SMerrorX for previously unobserved inputs, parameters, or scenarios X machine learning methods may be used, for example based on so-called Gaussian processes.

During the verification, the test subject (system under test, SUT) is typically studied on the basis of a requirement, specification, or performance indicator. It is to be noted that Boolean requirements or specifications may often be converted into quantitative measurements in that formalisms such as signal temporal logic (STL) are used. Such formalisms may be used as the basis of quantitative semantics, which represent a generalization of the verification insofar as a positive value indicates the fulfillment and a negative value indicates the infringement of a requirement. Such requirements, specifications, or performance measures are referred to in summary hereinafter as "quantitative requirements" (QSpec).

These types of quantitative requirements may be checked either on the basis of the real SUT or a model thereof—equivalent to a "virtual SUT." For the purpose of this verification, catalogs are compiled having test cases which a SUT has to meet in order to decide whether it has desired performance and safety properties. Such a test case may be parameterized and thus cover an arbitrary number of individual tests.

Against this background, an example embodiment of the present invention takes the need for reliable test results into consideration in order to ensure the performance and safety properties of a SUT. In particular when carrying out tests on the basis of a simulation of the system or a subcomponent—instead of the real system—it is to be ensured that the simulation results are trustworthy.

For this purpose, validation technologies are used to assess to what extent the simulation model and real measurements correspond. The comparison between the simulation results and the real measurements is carried out using the validation error metric SMerrorX, which is generalized by interpolation and extrapolation, so that the error measure for new inputs X may be predicted without carrying out corresponding measurements. However, the prediction of SMerrorX is linked to an uncertainty, which may be modeled as an interval or as a probability distribution.

The method in accordance with an example embodiment of the present invention provides assistance in the selection of a suitable simulation and model quality validation metric SMerrorX. Various validation metrics are available, for example the root mean square error or the above-mentioned standard ISO 18571. However, selecting among these metrics proves to be a challenge in practice, since the suitability of a specific metric is decisively dependent on requirements QSpec placed on the SUT. To solve this problem, the approach according to the present invention therefore makes use of the evaluation of tests which have already been carried out with respect to these requirements QSpec.

One advantage of this approach is that in contrast to concepts which are exclusively based on validation or exclusively on verification, both approaches are unified in a skilled way. For this purpose, in accordance with an example embodiment of the present invention, a "virtual test classifier" is introduced, which combines the requirements of model validation and product test. This is achieved by linking pieces of information from the validation of simulation and model quality (SMerrorX), on the one hand, and test requirements (QSpec), on the other hand.

Greatly varying fields come into consideration for the application of corresponding tests. For example, the functional reliability of automated systems is to be considered, as are used, for example, for automating driving functions (automated driving).

Advantageous refinements, improvements, and embodiments of the present invention are possible by way of the measures disclosed herein. An automated, computer-implemented test environment may thus be provided in order to improve the quality of the tested hardware or software products largely automatically.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

According to the present invention, in the context of a test X, which may be taken as a test case from a test catalog or may be obtained as an instance of a parametric test, simulation model error SMerrorX is evaluated and quantitative specification QSpec is assessed on the basis of a simulation of the SUT. The virtual test classifier uses SMerrorX and QSpec as the input and makes a binary decision as to whether the test result based on the simulation is trustworthy or not.

According to the linguistic usage typical in information technology and in particular pattern recognition, a classifier is to be understood here as any algorithm or any mathematical function which maps a feature space on a set of classes which were formed and bounded from one another in the course of a classification. To be able to decide in which class an object is to be categorized or classed (colloquially also "classified"), the classifier uses so-called class or decision limits. If it is not important to distinguish between method and instance, the term "classifier" is used in technical language and also sometimes in the following as equivalent with "classification" or "classing."

Figure 1:
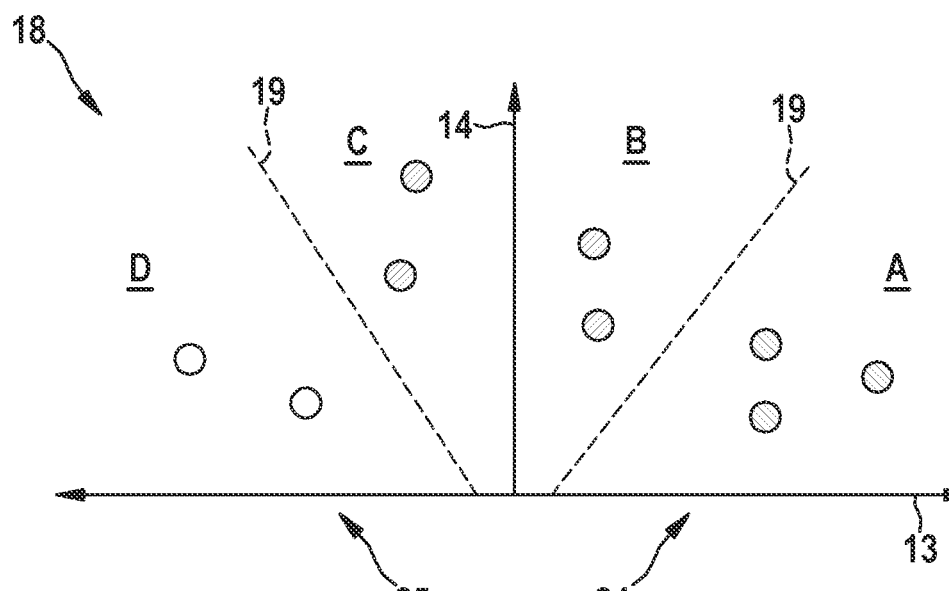
FIG. 1 shows a virtual test classifier, in accordance with an example embodiment of the present invention.

FIG. 1 illustrates such a classification in the present exemplary application. In this case, each point corresponds to a test which was carried out in the course of the simulation and for which fulfillment measure 13 of the requirement QSpec and error measure 14 SMerrorX were calculated. QSpec is defined in this case so that it assumes a positive value if it may be inferred from the tests that the system meets the respective requirement (reference numeral 24), and negative if the system fails the requirement (reference numeral 25).

As may be seen from the figure, decision limit 19 of classifier 18 divides the space into four classes A, B, C and D. Tests of class A were passed by the system with high reliability. For tests of classes B and C, the simulation only supplies unreliable results; such tests are therefore to be carried out on the real system. Tests of class D were failed on the system with high reliability.

This virtual test classifier 18 is based on the consideration that a requirement which is only barely met in the simulation may only replace the testing of the real system if at most a marginal model error 14 is to be presumed. On the other hand, in the event of a high absolute value of fulfillment measure 13 of quantitative requirement "QSpec," i.e., in the case of a specification which is greatly exceeded or clearly failed, a certain deviation of the simulation results from corresponding experimental measurements may be accepted.

Since this way of viewing things presumes the knowledge of model error SMerrorX of the simulation model, it is presumed that the latter was subjected to a verification and validation before the use of virtual test classifier 18. Within the scope of this validation—for example on the basis of a Gaussian process or otherwise by machine learning—a generalized model is to be formed which supplies SMerrorX for a given X. It is to be noted that the trustworthiness of the simulation is decisively dependent on the correctness of this generalized model.

Figure 2:
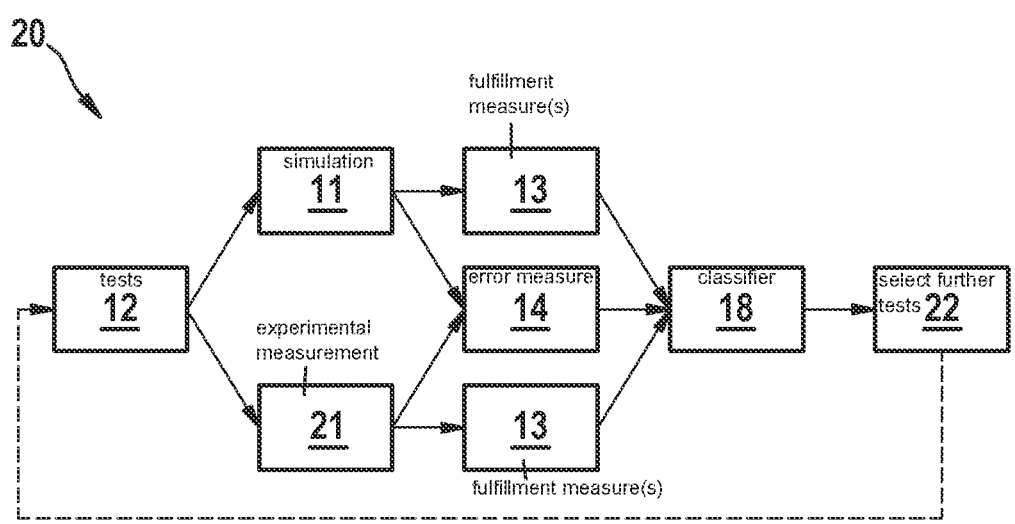
FIG. 2 shows a first approach for generating the decision limit of the classifier on the basis of data, in accordance with an example embodiment of the present invention.

FIG. 2 illustrates one possible approach for generating decision limit (19—FIG. 1) of classifier 18 on the basis of data. In the simplest case, limit 19 extends here along a line through the origin. The slope of the straight line is preferably to be selected so that all points in which fulfillment measure 13 of quantitative requirement QSpec differ in the sign between simulation 11 and real measurement 21—thus quasi all tests 12 in which the simulation model fails—are in areas C and B and these areas are moreover preferably small.

Furthermore, a more general, for example polynomial decision limit 19 comes into consideration, whose function curve is adapted with the aid of linear programming in such a way that it meets the criterion of a classifier 18 VTC. All points in which fulfillment measure 13 of quantitative requirement QSpec differ in the sign between simulation 11 and real measurement 21—thus quasi all tests 12 in which the simulation model fails—are also in areas C and B in this case.

Figure 3:
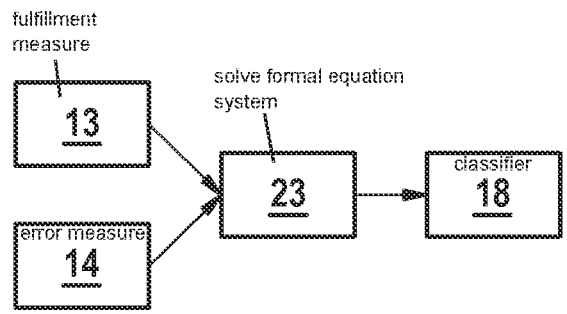
FIG. 3 shows a second approach for generating the decision limit of the classifier on the basis of a formal solution, in accordance with an example embodiment of the present invention.

FIG. 3 illustrates the alternative approach of defining classifier 18 by solving 23 a formal equation system, on which the definition equations of fulfillment measure 13 and error measure 14 are based. The resulting function, which assigns a truth value to feature vector 13, 14 formed from these two measures, may alternately be specified deterministically or stochastically.

For the purposes of the following statements, I is the input quantity, O is the output quantity—under certain circumstances also including inputs, and $m_1, m_2: I \rightarrow O$ is the system model and real system as functions, which may only be observed for a finite number of inputs by simulation 11 or experimental measurement 21. Furthermore $q: O \times O \rightarrow \mathbb{R}$ is simulation model error SMerrorX, i.e., distance or error measure 14 of two outputs corresponding to one another. Finally $I_\epsilon := \{i | q(m_1(i), m_2(i)) = \epsilon\}$ is the set of all inputs for which error measure 14 assumes the value $\epsilon$.

Starting from these definitions, the deviation of fulfillment measure 13 of a requirement for each input $i \in I_\epsilon$ may be restricted on the upper end as follows by a term which is dependent neither on $m_1$ nor on $m_2$:

$$\forall \epsilon \, \forall i \in I_\epsilon: |p(m_1(i)) - p(m_2(i))| \leq$$
$$\sup_{j \in I_\epsilon} |p(m_1(j)) - p(m_2(j))| \leq \sup_{(o_1, o_2) \in q^{-1}(\epsilon)} |p(o_1) - p(o_2)|$$

Classifier 18 therefore results as $$VTC(\epsilon, \delta) = \begin{cases} W & \text{if } |\delta| > \sup_{(o_1, o_2) \in q^{-1}(\epsilon)} |p(o_1) - p(o_2)| \\ F & \text{otherwise} \end{cases}.$$

The simulation model is classified as reliable here in the case of $VTC(\epsilon, \delta) = W$ in the meaning that $m_1$ and $m_2$ correspond with respect to p. It is to be noted that classifier 18 requires the reversal of q.

One main advantage of this representation is that virtual test classifier 18 may be formulated independently of $m_1$ and $m_2$ since it is only dependent on fulfillment measure 13 of the quantitative requirement and error measure 14. Proceeding from a single error measure 14 and a plurality n of quantitative requirements, n virtual test classifiers 18 may thus be calculated, namely one for each requirement. The model is therefore only to be validated once with respect to error measure 14 and not for example with regard to each individual requirement.

This observation may be generalized in a simple way for a plurality m of error measures and a plurality n of quantitative requirements, m typically resulting as very small and und n resulting as large. In this case, n·m virtual test classifiers 18 may be calculated. If one of these classifiers 1) supplies value W, the simulation result may be considered to be reliable. This enables a more precise classification, since some error measures 14 may be more suitable for certain applications than others.

Alternatively, virtual test classifier 18 may be defined in a stochastic framework, in which the inputs are assumed to be randomly distributed—according to an arbitrary probability density function. For this purpose, $F_\epsilon(\delta) = P(|p(m_1(i)) - p(m_2(i))| \leq \delta | q(m_1(i), m_2(i)) = \epsilon)$ denotes the conditional cumulative distribution function of the deviation of fulfillment measure 13 under the assumption that error measure 14 assumes value $\epsilon$. At a threshold value $\tau \in (0,1)$ of the probability that classifier 18 makes the correct decision—value $\tau$ is therefore typically close to 1—, virtual test classifier 18 may be defined as follows:

Formula 3

$$VTC(\epsilon, \delta) = \begin{cases} W & \text{if } |\delta| > \inf F_\epsilon^{-1}(\tau) \\ F & \text{otherwise} \end{cases}$$

Figure 4:
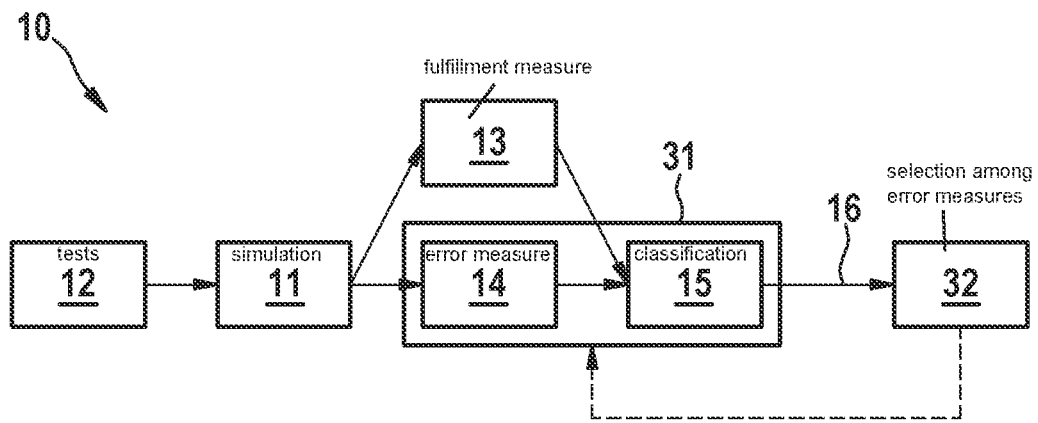
FIG. 4 shows the use of the classifier to select a suitable validation metrics SMerrorX, in accordance with an example embodiment of the present invention.

FIG. 4 illustrates a method 10 according to the present invention from an application viewpoint under the following assumptions:

A model for the simulation 11 and a set of tests (12) including defined input parameters are granted.

Requirements QSpec are quantifiable and predefined and are implemented within the scope of a monitoring system which evaluates tests 12 with respect to fulfillment measure 13 of these requirements. In the depiction, both fulfillment measures 13 relate to the same requirement QSpec, but evaluated once on the basis of simulation 11 and once in the course of experimental measurement 21 on the system.

SMerrorX is an error measure 14 which was defined beforehand. For some test inputs, simulation 11 and measurement 21 were thus already carried out, and error measure 14 generalizes corresponding tests 12 to new experiments which have not yet been carried out with a certain reliability, which is defined, for example, by an upper and lower limit for error measure 14. For classifier (18—FIGS. 1 through 3), only the most unfavorable, i.e., highest error measure 14, is used. It is to be noted that the classifier may be used to further refine error measure 14. Within the scope of the following statements, the classifier is equated for reasons of simplification with classification 15 carried out by it.

Under these assumptions, method 10 may be designed as follows:

1. For each error model 31, a classifier is defined according to the above explanations. It is to be noted that method 10 may be understood more generally as a simulation and model quality method.
2. Tests 12 are carried out with the aid of simulation 11, output signals being generated.
3. The output signals are evaluated with respect to fulfillment measure 13 of requirements QSpec and error measure 14 for each error model 31.
4. For each error model 31, the classifier based thereon carries out a classification 15 into one of the following classes (A, B, C, D—FIG. 1): Test 12 was successful in simulation 11 and its result is reliable 16; the test failed in simulation 11 and its result is reliable 16; or the result of simulation 11 is unreliable.
5. The classifier is selected according to one of the following criteria:
   a) the greatest possible number of all tests 12, the result of which was classified as reliable 16,
   b) the greatest possible number of tests 12 which have failed and the result of which was classified as reliable 16—attention is therefore placed on critical tests—or
   c) the greatest possible number of tests 12, which were successful and the result of which was classified as reliable 16—the attention is therefore on passed tests.
6. The error model of the selected classifier is returned 33.

Figure 5:
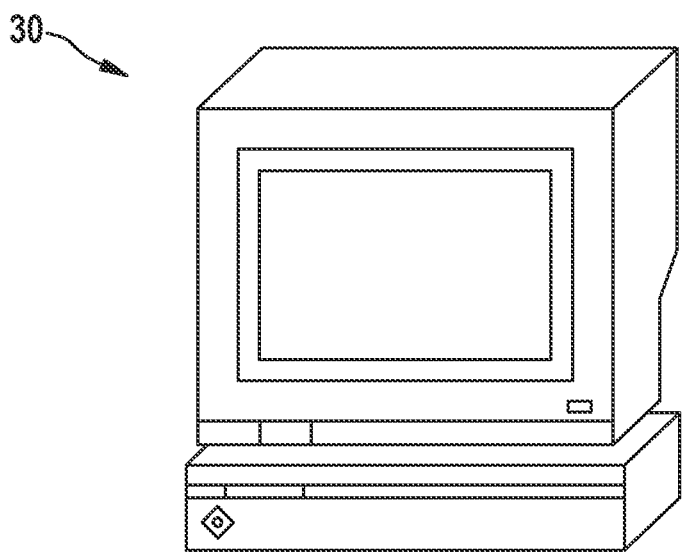
FIG. 5 schematically shows a workstation.

This method 10 may be implemented, for example in software or hardware or in a mixed form of hardware and software, for example in a workstation 30, as the schematic view of FIG. 5 shows.

What is claimed is:

1. A method for testing a technical system, comprising the following steps:
   carrying out tests using a simulation of the system;
   evaluating the tests with respect to a fulfillment measure of a quantitative requirement on the system and different error measures of the simulation;
   based on the fulfillment measure and each of the error measures, carrying out a classification of each of the tests as either reliable or unreliable case by case;
   selecting at least one error measure from among the error measures based on a number of the tests classified as reliable; and
   executing, by a classifier, the classification for each one of the error measures, wherein:
   the classification is based on a feature vector,
   the fulfillment measure and respective error measure form components of the feature vector,
   the classifier maps the feature vector on one of multiple classes;
   the classification is executed within predetermined decision limits between the classes in a preparation phase,
   the simulation is confirmed by experimental measurement on the system, and
   the decision limits are set in order to minimize a deviation between a first instance of the fulfillment measure that is taken in the simulation and a second instance of the fulfillment measure that is taken in the experimental measurement.

2. The method as recited in claim 1, wherein the technical system is an at least semi-autonomous robot or vehicle.

3. The method as recited in claim 1, wherein further tests to be carried out in the preparation phase are selected automatically.

4. The method as recited in claim 1, wherein:
   the classifier for the respective error measure is defined by solving an equation system; and
   the equation system includes definition equations of the fulfillment measure and particular error measure.

5. The method as recited in claim 1, wherein the evaluation is carried out in such a way that the fulfillment measure is positive when the system satisfies the requirement, and negative when the system fails the requirement.

6. The method as recited in claim 1, wherein:
   the selection that is made is of a first error measure of the error measures for which the number of the tests classified as reliable is greatest overall; or
   the selection that is made is of a second error measure of the error measures for which the number of the tests classified as reliable is greatest, wherein the system satisfies the requirement according to the selected second error measure; or
   the selection that is made is of a third error measure of the error measures for which the number of the tests classified as reliable overall is greatest, wherein the system fails the requirement according to the selected third error measure.

7. The method as recited in claim 1, wherein an automatic improvement of errors of the system recognized by the testing takes place.

8. A non-transitory machine-readable storage medium on which is stored a computer program for testing a technical system, the computer program, when executed by a computer, causing the computer to perform the following steps:
   carrying out tests using a simulation of the system;
   evaluating the tests with respect to a fulfillment measure of a quantitative requirement on the system and different error measures of the simulation;
   based on the fulfillment measure and each of the error measures, carrying out a classification of each of the tests as either reliable or unreliable case by case;
   selecting at least one error measure from among the error measures based on a number of the tests classified as reliable; and
   executing, by a classifier, the classification for each one of the error measures, wherein:
   the classification is based on a feature vector,
   the fulfillment measure and respective error measure form components of the feature vector,
   the classifier maps the feature vector on one of multiple classes;
   the classification is executed within predetermined decision limits between the classes in a preparation phase,
   the simulation is confirmed by experimental measurement on the system, and the decision limits are set in order to minimize a deviation between a first instance of the fulfillment measure that is taken in the simulation and a second instance of the fulfillment measure that is taken in the experimental measurement.

9. A device configured to test a technical system, the device configured to:
   carry out tests using a simulation of the system;
   evaluate the tests with respect to a fulfillment measure of a quantitative requirement on the system and different error measures of the simulation;
   based on the fulfillment measure and each of the error measures, carry out a classification of each of the tests as either reliable or unreliable case by case; and
   select at least one error measure from among the error measures based on a number of the tests classified as reliable; and
   execute, by a classifier, the classification for each one of the error measures, wherein:
   the classification is based on a feature vector,
   the fulfillment measure and respective error measure form components of the feature vector,
   the classifier maps the feature vector on one of multiple classes;
   the classification is executed within predetermined decision limits between the classes in a preparation phase,
   the simulation is confirmed by experimental measurement on the system, and
   the decision limits are set in order to minimize a deviation between a first instance of the fulfillment measure that is taken in the simulation and a second instance of the fulfillment measure that is taken in the experimental measurement.

10. The method as recited in claim 1, wherein the classifier is implemented as a stochastic framework, in which inputs are randomly distributed according to an arbitrary probability density function.

* * * * *